(12) United States Patent
Zhu et al.

(10) Patent No.: US 8,701,808 B2
(45) Date of Patent: Apr. 22, 2014

(54) SERIES/PARALLEL DUAL MOTOR MULTI-CLUTCH HYBRID DRIVING UNIT FOR VEHICLE

(75) Inventors: Jun Zhu, Shanghai (CN); Weimin Gao, Shanghai (CN); Jiangang Lu, Shanghai (CN); Hailong Ge, Shanghai (CN); Sidong Luo, Shanghai (CN); Jian Wang, Shanghai (CN)

(73) Assignee: Shanghai E-Propulsion Auto Technology Co., Ltd., Shanghai (CN)

( * ) Notice: Subject to any disclaimer, the term of this patent is extended or adjusted under 35 U.S.C. 154(b) by 0 days.

(21) Appl. No.: 13/328,188

(22) Filed: Dec. 16, 2011

(65) Prior Publication Data

US 2012/0208671 A1 Aug. 16, 2012

Related U.S. Application Data

(63) Continuation of application No. PCT/CN2010/000866, filed on Jun. 17, 2010.

(30) Foreign Application Priority Data

Jun. 17, 2009 (CN) .......................... 2009 1 0053257

(51) Int. Cl.
*B60K 1/02* (2006.01)

(52) U.S. Cl.
USPC .......................................... 180/65.6; 74/329

(58) Field of Classification Search
USPC ....................................................... 475/150
See application file for complete search history.

(56) References Cited

U.S. PATENT DOCUMENTS

| | | | |
|---|---|---|---|
| 5,562,565 A | 10/1996 | Moroto et al. | |
| 7,594,334 B2* | 9/2009 | Kocha | 30/276 |
| 2008/0121447 A1* | 5/2008 | Lang et al. | 180/65.2 |

FOREIGN PATENT DOCUMENTS

| | | |
|---|---|---|
| CN | 2647637 | 10/2004 |
| CN | 200480019795.5 | 8/2006 |
| CN | 1857941 | 11/2006 |
| CN | 1872576 | 12/2006 |
| CN | 200480038070.0 | 1/2007 |

(Continued)

OTHER PUBLICATIONS

Search Report from related PCT patent application PCT/CN2010/000866 dated Sep. 23, 2010.

*Primary Examiner* — Erin D Bishop

(57) ABSTRACT

A series/parallel dual motor dual-clutch hybrid electrical driving unit for vehicle includes: a main traction motor (17), an integrated starter-generator (4), a differential (7), a main shaft (8), a first stage decelerating device (9), a primary clutch (16) and a first clutch (15). Said traction motor (17) is connected with said first stage decelerating device (9) via said first clutch (15). A series/parallel dual motor triple clutch hybrid electrical driving unit for vehicle further includes a second clutch (12) and a second stage decelerating device (5) based on the above described series/parallel dual motor dual-clutch hybrid electrical driving unit. The hybrid electrical driving unit according to the invention is compact in structure arrangement, high efficient and rational in connection. The arrangement based on this invention can be utilized to connect or disconnect each individual hybrid source and wheel, and by altering the power-output torques, the shift of operation modes and gear positions of the hybrid driving system can be further realized.

27 Claims, 5 Drawing Sheets

(56) References Cited

FOREIGN PATENT DOCUMENTS

| CN | 200610141069.1 | 4/2008 |
| CN | 101327728 | 12/2008 |
| CN | 101342859 | 1/2009 |
| CN | 101380887 | 3/2009 |
| CN | 101380887 A * | 3/2009 |
| JP | 2005161971 | 6/2005 |
| WO | WO9728030 A1 | 8/1997 |

* cited by examiner

| Operation mode | Primary clutch | First clutch | Engine | Integrated starter-generator | Main traction motor |
|---|---|---|---|---|---|
| neutral gear parking mode | disengaged | disengaged | stop operating | stop operating | stop operating |
| stop-to-charge mode | disengaged | disengaged | output power | ignite the engine first, then operate as a generator | stop operating |
| pure electric driving mode | disengaged | engaged | stop operating | stop operating | output power |
| hybrid parallel driving mode | engaged | engaged | output power | one of the integrated starter-generator and the main traction motor outputs power | one of the main traction motor and the integrated starter-generator outputs power |
| rapid acceleration mode | engaged | disengaged | output power | output power | output power |
| charge-in-travelling series operation mode | disengaged | engaged | drive the integrated starter-generator | generator | output power |
| charge-in-travelling parallel operation mode | engaged | engaged | output power | generator | output power |
| braking deceleration energy recycling | without restriction | engaged | without restriction | generator or stop operating | generator or stop operating |

Fig. 6

| Operation mode | Primary clutch | First clutch | Second clutch | Engine | Integrated starter-generator | Main traction motor |
|---|---|---|---|---|---|---|
| neutral gear parking mode | disengaged | disengaged | disengaged | stop operating | stop operating | stop operating |
| stop-to-charge mode | disengaged | disengaged | disengaged | output power | ignite the engine first, then operate as a generator | stop operating |
| pure electric driving first gear mode | disengaged | engaged | disengaged | stop operating | stop operating | output power |
| pure electric driving second gear mode | disengaged | disengaged | engaged | stop operating | stop operating | output power |
| hybrid parallel driving first gear mode | engaged | engaged | disengaged | operate | one of the integrated starter-generator and the main traction motor outputs power | one of the main traction motor and the integrated starter-generator outputs power |
| hybrid parallel driving second gear mode | engaged | disengaged | engaged | operate | one of the integrated starter-generator and the main traction motor outputs power | one of the main traction motor and the integrated starter-generator outputs power |
| rapid acceleration first gear mode | engaged | disengaged | engaged | output power | output power | output power |
| rapid acceleration second gear mode | engaged | engaged | disengaged | output power | output power | output power |
| charge-in-travelling series operation first gear mode | disengaged | engaged | disengaged | drive the integrated starter-generator | generator | output power |
| charge-in-travelling series operation second gear mode | disengaged | disengaged | engaged | drive the integrated starter-generator | generator | output power |
| charge-in-travelling parallel operation first gear mode | engaged | engaged | disengaged | output power | generator | output power |
| charge-in-travelling parallel operation second gear mode | engaged | disengaged | engaged | output power | generator | output power |
| braking deceleration energy recycling | without restriction | engaged or disengaged | disengaged or engaged | without restriction | generator or stop operating | generator or stop operating |

Fig. 7

SERIES/PARALLEL DUAL MOTOR MULTI-CLUTCH HYBRID DRIVING UNIT FOR VEHICLE

CROSS-REFERENCE TO RELATED APPLICATIONS

This application is a continuation of PCT patent application PCT/CN2010/000866, filed Jun. 17, 2010, which claims priority to Chinese Patent Application No. 200910053257.2 filed Jun. 17, 2009. The content of PCT patent application PCT/CN2010/000866 is hereby incorporated herein by reference.

FIELD OF THE INVENTION

The invention relates to hybrid vehicle, especially the plug-in hybrid vehicle (PHEV) drive and shifting arrangement. In more specifically, it related to the hybrid power train that is driven by dual e-motors equipped with multi-clutch system and the associated electric controlled system to perform the multiple stage shifting function, along with the corresponding optimal control method.

BACKGROUND

Energy saving and environmental protection have become the main focus in current automobile industry for new vehicle development. With this respective, the hybrid vehicle has turned into a main core technology and pursued by many automobile manufactures globally. Wherein, except the pure e-drive, the PHEV is one of the most fuel saving solutions, it has being advocated by many major automobile manufacturers. The PHEV primary consists of a relative lower displacement engine and one or two motors. Under normal vehicle running, the motor is generally responsible for providing pure electric power output and braking recycling energy at intermediate and low speeds, it also is used to achieve engine starting, while the engine can generate electricity by turning the motor when necessary, or take part in or boost power driving.

In current technology, the engine and the motor in the above-described plug-in type hybrid driving system are coupled mostly by the following ways:

I. Series solution: Such as GM Volt hybrid concept, it is a typical PHEV, The battery in the hybrid driving system can be charged by using the outlet of household power supply (e.g. 110V/220V). The PHEV can provide a longer pure electrically-driven travelling distance than a full hybrid electric vehicle. While when the battery power is dropping at a low level, the engine will automatically start to generate electricity through motor for battery charge to provide power, but the engine in this model does not take part in vehicle running operation directly. Under the long distance travelling condition, it required to convert mechanical (engine) energy into electric energy (thru motor/generator then store in battery), and then re-converting the electric energy into mechanical (driving motor) energy for power output. Therefore, the operational efficiency by the engine power is relative lower. Besides, in order to ensure acceleration/climbing performance of the vehicle, the demands on main traction motor and battery power are higher than the normal running condition, thus boosts higher cost on vehicle.

II. Parallel solution: Such as VW Phaeton GP2 hybrid vehicle. It is a driving-generating integrated machine, applying two clutches to connect the engine and conventional gear box. This hybrid vehicle design is simple in structure with lower cost. However, it can only be adapted to a large vehicle or rear driving vehicle, because the requirements on spatial dimensions of driving system inside the vehicle are high. Besides, the output power of the driving-generating integrated machine is generally not large enough, making it difficult to ensure the driving performance of the vehicle, when it is extensively driven by the pure electric drive mode.

III. Series-parallel Power Split solution: Such as Toyota Hybrid System (referring to CN patent application No. 200480019795.5, entitled "Power Output Device for Hybrid Vehicle"), and the Advanced Hybrid System proposed by General Motors Corporation (referring to CN patent application No. 200480038070.0, entitled "Hybrid Electromechanical Transmission of Complex Distribution Mode of Dual Mode Having Four Fixed Gear Ratios"), the engine and two motors are connected via one or more planetary gear systems, wherein power reconciling and gear shift are realized by power split principle in order to meet travelling requirements of the whole vehicle. However, power transmission path is complicated with this method, and there exists a power transfer loss phenomenon caused by unnecessarily converting mechanical energy into electric energy and re-converting the electric energy into mechanical energy for power output. Therefore, this method, when used in plug-in hybrid vehicle, will cause reduction of pure electrically-driven travelling distance.

F3DM type hybrid vehicle: This is another example, the vehicle is launched by BYD Holding Ltd. Using a relatively simple connection manner (referring to CN patent application No. 200610141069.1, entitled "Driving Device for Hybrid Vehicle"), the engine and a starting-generating integrated machine are linked together then connected them with another main motor via a clutch. Through the input shaft, the power flow is passing by a speed reducer or decelerator and then via the differential and finally reached to the axial shafts. This method is simple in structure, and under the ideal operational condition power is transmitted through directly; therefore, the transmission efficiency is high. However, under the real driving condition, when the vehicle is in purely electrical drive, it is very difficult to meet all design requirements in terms of climbing, acceleration performance and maximum electric travelling speed simultaneously, since the main decelerator drives the vehicle directly. In general, a large torque and high speed motor must be employed, that makes the demands on functions of electronic (electric) power controller and battery system for matching with the motor increase accordingly. Even so, it is very difficult to ensure the motor could often operate in a higher efficiency region under the urban traveling condition. In addition, in case when the energy of battery is low, so it is required to change into motor/engine hybrid travelling mode, but due to restrictions on minimum stable rotation speed and torque characteristics of engine, the engine will only be able to operate in a way like that in the above described series mode in many travelling conditions, such as when confronted with intermediate and low speeds urban road and ramp road conditions, thus reducing energy utilization efficiency greatly.

CONTENT OF THE INVENTION

In viewing of the deficiencies of the current existing technology, the objective of the invention is to provide a series/parallel dual motor multi-clutch hybrid electrical driving unit for vehicle as well as a corresponding driving system and driving control method by making the improvement on the structure and connection arrangement of hybrid driving system.

According to one aspect of the invention, the invention provides a dual-clutch hybrid electrical driving unit for vehicle comprising a main traction motor, an integrated starter-generator, a differential, a main shaft, a first stage decelerating device and a primary clutch, wherein the main shaft is connected to the main traction motor, a driving disc of the primary clutch is connected to the integrated starter-generator and an engine of vehicle, a driven disc of the primary clutch is connected to the main shaft, and the hybrid electrical driving unit outputs power via the first stage decelerating device, characterized in that the hybrid electrical driving unit further comprises a first clutch, and the main traction motor is connected to the first stage decelerating device via the first clutch.

According to another aspect of the invention, the invention also provides a triple clutch hybrid electrical driving unit for vehicle which is based on the dual-clutch hybrid electrical driving unit concept described in the above paragraph, and further comprises a second clutch and a second stage decelerating device, wherein the main traction motor is connected to the second stage decelerating device via the second clutch, and is further connected to the first stage decelerating device via the second stage decelerating device.

According to one aspect of the invention, the invention provides a dual-clutch hybrid driving system for vehicle comprising a main shaft, a primary clutch, a first stage decelerating device, a main traction motor, an integrated starter-generator and an engine, wherein the hybrid driving system further comprises a first clutch and a first gear shaft, a driving disc of the primary clutch of the hybrid driving system is connected to the engine and a rotor support of the integrated starter-generator, a driven disc of the primary clutch is connected to one end of the main shaft, an end of the main shaft which is away from the primary clutch is connected to a rotor support of the main traction motor, the rotor support of the main traction motor is sequentially connected to the first gear shaft and a first stage driving gear of the first stage decelerating device via the first clutch, and the first stage driven gear is connected to a differential of vehicle.

According to still another aspect of the invention, the invention also provides a control method of a hybrid driving system based on the above described dual-clutch structure, the method at least comprising a neutral gear parking mode, a stop-to-charge mode, a rapid acceleration mode, a pure electric driving mode, a hybrid parallel driving mode, a charge-in-travelling series operation mode, a charge-in-travelling parallel operation mode and a braking deceleration energy recycling mode.

According to another aspect of the invention, the invention also provides a triple clutch structure hybrid driving system for vehicle which, on the basis of the dual-clutch hybrid driving system aforementioned, further comprises a second clutch, a second gear shaft, a third gear shaft and a second stage decelerating device, wherein a rotor support of the main traction motor is sequentially connected to the second gear shaft and a second stage driving gear of the second stage decelerating device via the second clutch, and the second stage driven gear is connected to a bridge gear of the first stage decelerating device via the third gear shaft.

According to still another aspect of the invention, the invention also provides a control method of a hybrid driving system based on the above described triple clutch structure, the method at least comprising a neutral gear parking mode, a stop-to-charge mode, a rapid acceleration and gear shift mode, a pure electric driving and gear shift mode, a hybrid parallel driving and gear shift mode, a charge-in-travelling series operation and gear shift mode, a charge-in-travelling parallel operation and gear shift mode, and a braking deceleration energy recycling mode.

The hybrid driving unit provided by the invention can be designed and manufactured as a separate working component of hybrid vehicle. For example, it can be provided to whole vehicle manufacturers as a separate component so as to realize integration.

By a simple and effective design, the hybrid driving system provided by the invention can realize a series/parallel power output of hybrid vehicle by properly taking advantage of power output by the engine and two motors, and can switch between different operation modes based on different road conditions and battery volumes so as to achieve energy saving and environment protection for hybrid vehicle and meet demands on system performances as required under different road conditions. At least on the basis of a hybrid driving system provided in the current existing technology which consists of a main shaft, a primary clutch, a first stage decelerating device, a main traction motor, an integrated starter-generator and an engine, etc., the invention preferably employs a first clutch, a first gear shaft, a second clutch, a second gear shaft, a third gear shaft and a second stage decelerating device, etc., so that a proper connection of individual power sources is realized in a hybrid driving system. Moreover, by the provision of three clutches and individual gear shafts, the power source of the main traction motor and transmission components of the hybrid electrical driving unit are connected in a proper and compact manner so as to realize a switch between connection and disconnection of individual hybrid sources and wheel and realize a shift of operation modes and gear positions of the hybrid driving system by shifting power-output torque.

Furthermore, the triple clutch hybrid driving system provided by the invention is able to realize a continuous power gearshift function when shifting gear positions by controlling a synchronous disengagement/engagement of the first clutch and the second clutch.

In addition, the design of this invention provides rooms to accommodate both clutches in between the cavity of each motor rotor support and main drive shaft. By doing so, the design can be more compact and thus left more space for other component interconnection usage.

BRIEF DESCRIPTION OF THE DRAWINGS

Other features, objectives and advantages of the invention will become more apparent upon reading the following detailed description of non-limiting embodiments with reference to the accompanying drawings:

FIG. 6 illustrates an operation mode table of the dual-clutch hybrid driving system for vehicle provided by the invention and in accordance with the first embodiment of the invention; and FIG. 7 illustrates an operation mode table of the triple clutch hybrid driving system for vehicle provided by the invention and in accordance with the second embodiment of the invention.

Figure 1:
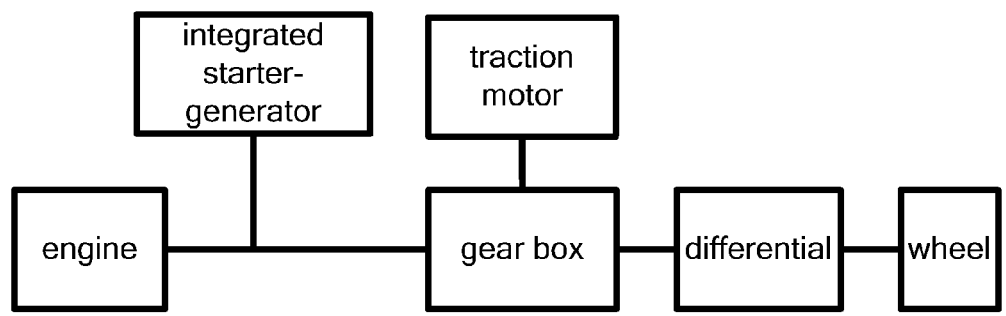
FIG. 1 illustrates a principle view showing a driving system of a hybrid vehicle and connection relationship among components such as an electrical driving unit according to one particular embodiment of the invention.

| Description of element reference numerals | |
|---|---|
| 1. engine | 2. driving disc of primary clutch |
| 3. driven disc of primary clutch | 4. integrated starter-generator |
| 5. second stage decelerating device | 6. third gear shaft |
| 7. differential | 8. main shaft |
| 9. first stage decelerating device | 10. first gear shaft |
| 11. second gear shaft | 12. second clutch |
| 13. rotor of main traction motor | 14. rotor support of main traction motor |
| 15. first clutch | 16. primary clutch |
| 17. main traction motor | 19. shock absorbing spring |
| 20. wheel | 41. rotor support of integrated starter-generator |
| 42. rotor of integrated starter-generator | |

DETAILED DESCRIPTION OF EMBODIMENTS

FIG. 1 illustrates a principle view showing a hybrid driving system and connection relationship among components such as an electrical driving unit according to one particular embodiment of the invention, i.e., showing connection manner of an engine, wheels, and an integrated starter-generator, a main traction motor, a differential and other various components of an electrical driving unit of a hybrid vehicle applied with a hybrid driving system provided by the invention, wherein the engine and the electrical driving unit constitute the hybrid driving system of the invention. Specifically, the engine is connected to the electrical driving unit which outputs a hybrid power to the wheel via the differential. The specific connecting manner and operation mode will be discussed in detail in the following particular embodiments and a repeated description is omitted herein. Those skilled in the art will understand that the gear box shown in FIG. 1 could be a conventional mechanical gear box which is herein used as a component for realizing gear shift and power transmission in the electrical driving unit. In a variation example, the gear box can also be replaced by a mechanical structure which is able to realize the gear shift and power transmission functions without having an influence on the substantive content of the invention. Further, those skilled in the art will understand that a conventional vehicle typical consists of four basic portions, i.e., an engine, a chassis, a vehicle body and electrical equipments, while the hybrid driving system provided by the invention comprises three power sources of a hybrid vehicle (i.e., a main traction motor, an integrated starter-generator and an engine) and some structures of vehicle chassis and electrical equipments so as to realize some functions of engine, chassis and electrical equipments of the conventional vehicle, which are equivalent to power system, chassis and electrical equipments of a hybrid vehicle. Specifically, those skilled in the art can make reference to other related power system, chassis, vehicle body and electrical equipments, etc. in the current existing technology so as to ensure that the hybrid driving system and corresponding electrical driving unit match with other components in order to construct a hybrid vehicle. A detailed discussion thereof is not provided herein.

Further, the hybrid two-stage electrical driving unit provided by the invention also realize a gear shift among a neutral gear, a first gear and a second gear of hybrid vehicle, and enables the hybrid driving system to accommodate operation requirements under various road conditions without the need to match with an engine and main traction motor with high performance, making the hybrid vehicle better conform to practical requirements. The specific operation principle will be discussed in detail in first and second embodiments of the invention and a repeated description is thus omitted herein.

Furthermore, the hybrid two-stage electrical driving unit provided by the invention can also realize a continuous power gear shift function by a control of the whole vehicle controller when performing gear position switch. It is the first time that this technology is applied to a hybrid vehicle. The application of this technology not only makes the hybrid driving system provided by the invention have a better energy saving effect, but also have a higher driving performance The specific operation principle will be discussed in detail in the following second embodiment and a repeated description is thus omitted herein.

Figure 2:
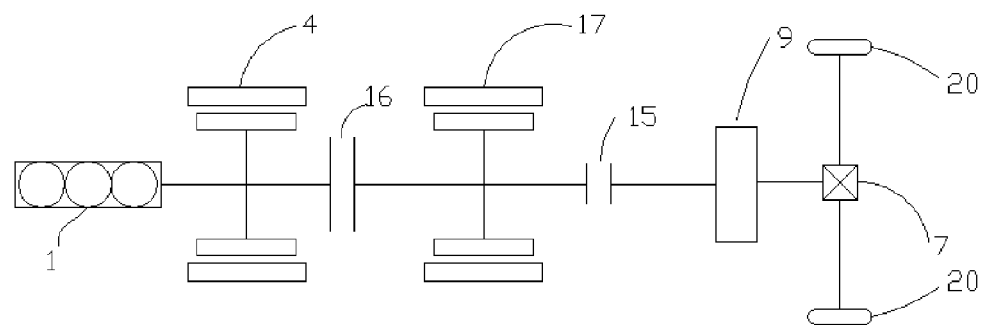
FIG. 2 illustrates a schematic structure view of a dual-clutch hybrid driving system for vehicle provided by the invention and in accordance with a first embodiment of the invention.
Figure 3:
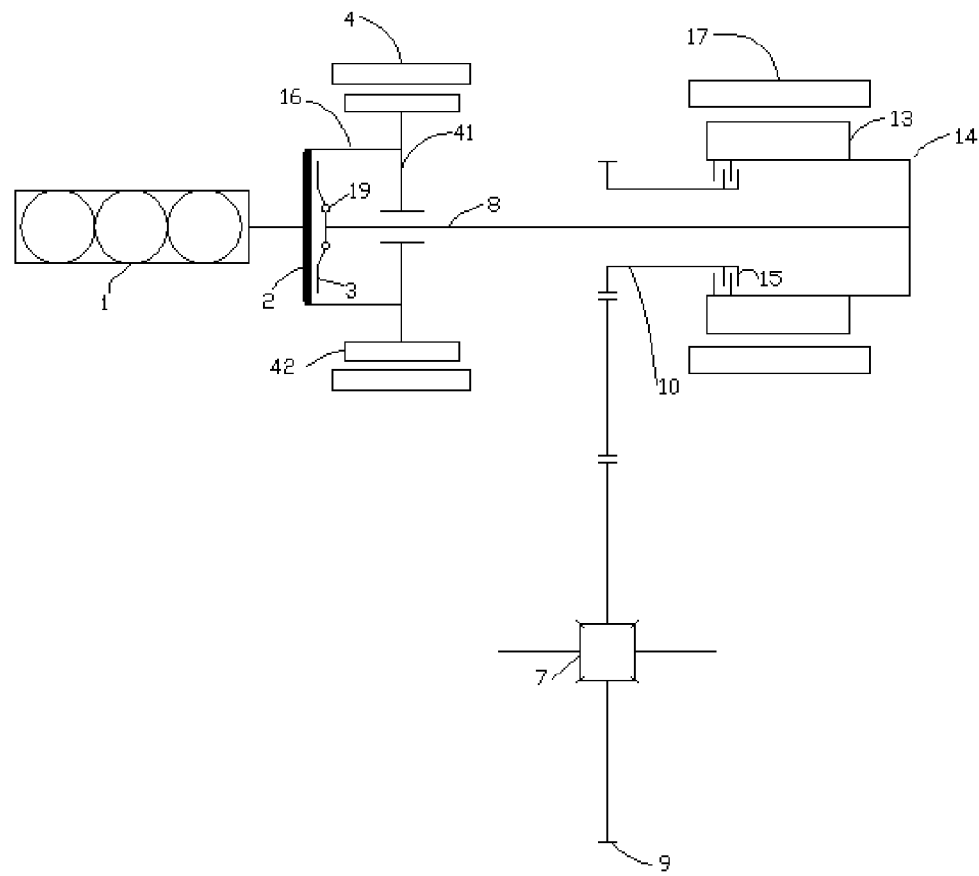
FIG. 3 illustrates a mechanical structure view of the dual-clutch hybrid driving system for vehicle provided by the invention and in accordance with the first embodiment of the invention.

FIGS. 2 and 3 respectively illustrate a schematic structure view and a mechanical structure view of a dual-clutch hybrid driving system for vehicle provided by the invention and in accordance with a first embodiment of the invention wherein FIG. 2 only illustrates a brief connection relationship between various components of the driving system, and FIG. 3 illustrates a detailed mechanical connection manner of various components of the driving system. The embodiment will be described hereinafter by taking FIG. 3 as an example, wherein the hybrid driving system comprises a main shaft 8, a primary clutch 16, a first stage decelerating device 9, a main traction motor 17, an integrated starter-generator 4 and an engine 1, and further comprises a first clutch 15 and a first gear shaft 10. A driving disc 2 of the primary clutch 16 is connected to the engine 1 and a rotor support 41 of the integrated starter-generator 4; specifically, in this embodiment, a portion of the driving disc 2 that is near the center is directly connected to the engine 1, and accordingly, the driving disc 2 is connected to the rotor support 41 of the integrated starter-generator at its edge away from the center. A driven disc 3 of the primary clutch 16 is connected to one end of the main shaft 8 via a shock absorbing spring 19; specifically, in this embodiment, a center portion of the driven disc 3 is connected to the main shaft 8. An end of the main shaft 8 away from the primary clutch 16 is connected to a rotor support 14 of the main traction motor 17. The rotor support 14 of the main traction motor is connected to one end of the first gear shaft 10 via the first clutch 15, and the other end of the first gear shaft 10 is connected to a first stage driving gear of the first stage decelerating device 9. A first stage driven gear of the first stage decelerating device 9 is connected to a vehicle differential 7.

With reference to FIG. 3, in this embodiment, the engine 1 and the integrated starter-generator 4 are connected to the driving disc 2 of the primary clutch 16 simultaneously. Those skilled in the art will understand that such a design enables a power connection between the engine 1 and the integrated starter-generator 4 to be maintained, i.e., the engine 1 can output power to the integrated starter-generator 4, and the integrated starter-generator 4 can either generate electricity by using power output by the engine 1, or can output power together with the engine 1. The main shaft 8 is used to transmit power of each power source of the hybrid driving system.

The hybrid driving system achieves power connection and disconnection between the engine 1 and the integrated starter-generator 4 and the main shaft 8 by controlling disengagement and engagement of the primary clutch 16. Specifically, the driven disc 3 of the primary clutch 16 is connected to the main shaft 8 so that the hybrid driving system can control the engine 1 and the integrated starter-generator 4 to output mechanical power directly to the wheel 20 or not, by controlling disengagement and engagement of the primary clutch 16. The main shaft 8 is directly connected to the rotor support 14 of the main traction motor so that the power output by the engine 1 and the integrated starter-generator 4 can be transmitted to the rotor support 14 of the main traction motor so as to realize power coupling of three power sources of the hybrid driving system. Preferably, a driving disc of the first clutch 15 is provided on the rotor support 14 of the main traction motor, and a driven disc of the first clutch 15 is provided on the first gear shaft 10 so that the hybrid driving system is connected to the first gear shaft 10 via the first clutch 15 and power is output outwardly through the first clutch 15, the first gear shaft 10, the first stage decelerating device 9 and the differential 7 in order to obtain a power transmission path of the hybrid driving system.

Further, those skilled in the art will understand that in this embodiment, other components (and their connection manner) of the hybrid driving system except for the vehicle engine 1 constitute the hybrid electrical driving unit of the invention. Specifically, with reference to FIGS. 2 and 3, the hybrid electrical driving unit for vehicle comprises the main traction motor 17, the integrated starter-generator 4, the differential 7, the main shaft 8, the first stage decelerating device 9, the primary clutch 16 and the first clutch 15, wherein the main shaft 8 is connected to the main traction motor 17, the driving disc 2 of the primary clutch 16 is connected to the integrated starter-generator 4 and vehicle engine 1, the driven disc 3 of the primary clutch 16 is connected to the main shaft 8, the main traction motor 17 is connected to the first stage decelerating device 9 via the first clutch 15, and the hybrid electrical driving unit outputs power via the first stage decelerating device 9. Specifically, connection manner of the electrical driving unit can be conducted with reference to the hybrid driving system described in this embodiment and redundant description is omitted herein. Those skilled in the art will understand that the hybrid driving unit can be designed and manufactured as a separate operation component of the hybrid vehicle. For example, it can be supplied to whole vehicle manufacturer as a separate component so as to realize a technical effect of integration.

Preferably in this embodiment, the main shaft 8 and the first gear shaft 10 are arranged coaxially in the hybrid driving system. Preferably, the first gear shaft 10 is provided in the periphery of the main shaft 8 as a hollow shaft. Those skilled in the art will understand that it does not have an influence on substantive content of the invention and redundant description is therefore omitted.

Further, in this particular embodiment, the driven disc 3 of the primary clutch 16 is preferably connected to one end of the main shaft 8 via the shock absorbing spring 19. Those skilled in the art will understand that the driven disc 3 of the primary clutch 16 can also be connected to the main shaft 8 via other elastic devices as long as the technical objective of shock absorbing can be achieved. Redundant description thereof is also omitted.

Further, those skilled in the art will understand that the hybrid driving system provided by the invention outputs power via the first stage decelerating device 9. Specifically, the first stage decelerating device 9 comprises a first stage driving gear and a first stage driven gear. In this embodiment, the first stage driving gear of the first stage decelerating device 9 is provided on the first gear shaft 10. Preferably, the first stage decelerating device 9 may further comprise a bridge gear, i.e., the first stage driving gear and the first stage driven gear can intermesh with each other via a gear ring of the bridge gear as required so as to vary speed difference output and center distance of the main shaft 8. Specifically, in this embodiment, the first stage driving gear of the first stage decelerating device 9 is connected to one end of the first gear shaft 10; in an direction perpendicular to the main shaft 8, the first stage driving gear intermeshes with the bridge gear and the bridge gear intermeshes with the first stage driven gear, which is in turn connected to a housing of the differential 7. Those skilled in the art will understand that the above described design achieves transmission of power output by the hybrid driving system, when the first clutch 15 is engaged, the hybrid driving system outputs power to the first stage decelerating device 9 via the first gear shaft 10, at which time the speed reduction ratio of the first stage decelerating device 9 is equivalent to tooth number ratio of the first stage driven gear and the first stage driving gear, thus realizing increase of final output torque of the hybrid driving system.

Further, in this embodiment, the primary clutch 16 is provided in a space formed by the rotor support 41 of the integrated starter-generator and the main shaft 8. Specifically, with reference to FIG. 3, the driving disc 2 of the primary clutch 16 is provided in the space on one side adjacent to the engine 1 and is connected to the rotor support 41 of the integrated starter-generator, and the driven disc 3 of the primary clutch 16 is provided in the space on one side adjacent to the main shaft 8. At this moment, the primary clutch 16 in this embodiment can be arranged without increasing volume of the hybrid driving system provided by the invention and altering the arrangement of other components of the hybrid driving system, which makes full use of space inside the hybrid driving system so that the design of hybrid driving system is made more compact. Those skill in the art will understand that since the driving disc 2 of the primary clutch 16 is connected to the rotor support 41 of the integrated starter-generator, preferably, in the invention, the driven disc 3 of the primary clutch 16 is arranged inside a connecting mechanism between the driving disc 2 of the primary clutch 16 and the integrated starter-generator 4. Redundant description thereof is also omitted.

Still further, in this embodiment, it is preferable to cancel the flywheel, i.e., the moments of inertia of the rotor 42 and rotor support 41 of the integrated starter-generator and the driving disc 2 of the primary clutch 16 are designed to be equivalent to a conventional engine flywheel so that a conventional engine flywheel can be cancelled. This design of the invention enables a vehicle applied with the invention to cancel engine flywheel, thus making the connection between the hybrid electrical driving unit and the engine more compact.

Further, in this embodiment, the first clutch 15 is provided in a space formed by the rotor support 14 of the main traction motor and the main shaft 8. Specifically, with reference to FIG. 3, the first clutch 15 is provided at a side adjacent to the primary clutch 16 in the space formed by the rotor support 14 of the main traction motor and the main shaft 8, the driving disc of the first clutch 15 is connected to the rotor support 14 of the main traction motor, and the driven disc of the first clutch 15 is connected to one end of the first gear shaft 10. Similarly, the first clutch 15 in this embodiment can be arranged without increasing volume of the hybrid driving system provided by the invention and altering the arrangement of other components of the hybrid driving system, which makes full use of space inside the hybrid driving system so that the design of hybrid driving system is made more compact. Those skilled in the art will understand that the first clutch 15 can also be arranged or connected in other ways as long as the control to power output of the hybrid driving system can be realized. Redundant description thereof is also omitted.

FIG. 6 illustrates an operation mode table of the dual-clutch hybrid driving system for vehicle provided by the invention and in accordance with the first embodiment of the invention. With reference to the above described FIGS. 2, 3 and 6, those skilled in the art will understand that when a hybrid driving system for vehicle is applied with the hybrid driving system provided by the first embodiment of the invention, a switch between different operation states of the hybrid driving system can be realized by using a clutch control system to control disengagement and engagement of the first clutch 15, and the hybrid driving system for vehicle realizes power disconnection and connection between the hybrid driving system and the wheel 20 by disengagement and engagement of the first clutch 15. That is, when the first clutch 15 is engaged, the hybrid driving system can output power to the wheel 20, and when the first clutch 15 is disengaged, the hybrid driving system dose not output power to the wheel 20. Correspondingly, a hybrid whole vehicle control system for vehicle performs control to the engine 1, the integrated starter-generator 4 and the main traction motor 17 on basis of requirements on driver's accelerator/brake pedal input so as to realize various operation modes for the hybrid vehicle. Specifically, in the embodiment, at least on basis of the architecture of the hybrid driving system for vehicle shown in FIG. 2, the main traction motor 17 can be at least provided with a neutral gear parking mode, a stop-to-charge mode, a rapid acceleration mode, a pure electric driving mode, a hybrid parallel driving mode, a charge-in-travelling series operation mode, a charge-in-travelling parallel operation mode and a braking deceleration energy recycling mode, etc.

Those skilled in the art will understand that in this embodiment, the hybrid driving system for realizing the aforementioned control modes comprises the main shaft 8, the primary clutch 16, the first stage decelerating device 9, the main traction motor 17, the integrated starter-generator 4 and the engine 1, and further comprises the first clutch 15 and the first gear shaft 10 for realizing cease and activation of hybrid power output according to the invention. Specifically, in this embodiment, the driving disc 2 of the primary clutch 16 is connected to the engine 1 and the rotor support 41 of the integrated starter-generator, and the driven disc 3 of the primary clutch 16 is connected to one end of the main shaft 8 via the shock absorbing spring 19; one end of the main shaft 8 which is away from the primary clutch 16 is connected to the rotor support 14 of the main traction motor, and the rotor support 14 of the main traction motor is sequentially connected to the first gear shaft 10 and the first stage driving gear of the first stage decelerating device 9 via the first clutch 15, and the first stage driven gear is connected to the differential 7.

Specifically, the operation modes based on the first embodiment will be described respectively hereinafter.

1) When a vehicle applied with the hybrid driving system for vehicle is in the neutral gear parking mode, the three power sources of the hybrid driving system for vehicle, i.e., the engine 1, the main traction motor 17 and the integrated starter-generator 4 are disconnected from the wheel 20 in power transmission. In this mode, the primary clutch 16 and the first clutch 15 are controlled to be disengaged, and the engine 1, the main traction motor 17 and the integrated starter-generator 4 are controlled to stop operating. Those skilled in the art will understand that when the vehicle applied with the hybrid driving system for vehicle is in the neutral gear parking mode and power sources of the hybrid driving system are therefore disconnected from the wheel 20 in power transmission, a neutral gear parking function is realized and the motor and inverter are prevented from being damaged due to an overly high potential when it is required to tow the vehicle because of vehicle failure.

2) When a vehicle applied with the hybrid driving system for vehicle is in the stop-to-charge mode, the integrated starter-generator 4 charges a battery pack of the hybrid vehicle by making use of power output by the engine 1 when the vehicle is stopped. In this mode, the primary clutch 16 and the first clutch 15 are controlled to be disengaged, the whole vehicle controller of the hybrid vehicle controls the integrated starter-generator 4 to firstly enter an activation mode so as to perform ignition operation on the engine 1; then the integrated starter-generator 4 enters an electricity generating operation mode so as to charge the battery pack, and the main traction motor 17 does not operate. Those skilled in the art will understand that only when the whole vehicle controller detects that the battery volume is overly low, e.g., when the vehicle is stopped for a long time period and the air conditioner is in the operation state, will it be necessary to enter the stop-to-charge mode.

3) When a vehicle applied with the hybrid driving system for vehicle is in the rapid acceleration mode, the hybrid driving system uses power collectively output by the engine 1, the integrated starter-generator 4 and the main traction motor 17 to drive the vehicle in running In this mode, the engine 1, the main traction motor 17 and the integrated starter-generator 4 are controlled to output power, and the primary clutch 16 and the first clutch 15 are controlled to be engaged. Those skilled in the art will understand that when the vehicle applied with the hybrid driving system for vehicle has to accelerate rapidly, the engine 1, the main traction motor 17 and the integrated starter-generator 4 collectively output power to drive the vehicle so as to maximize output power of the hybrid driving system.

4) When a vehicle applied with the hybrid driving system for vehicle is in the pure electric driving mode, the hybrid driving system drives the vehicle in running by using power output by the main traction motor 17. In this mode, the main traction motor 17 is controlled to output power, the engine 1 and the integrated starter-generator 4 are controlled to stop operating, the primary clutch 16 is controlled to be disengaged, and the first clutch 15 is controlled to be engaged. Those skilled in the art will understand that when the power required by vehicle is lower than a driving power that can be provided by the main traction motor 17 and the volume of battery pack is enough, the main traction motor 17 will drive the vehicle alone, the battery pack provides electricity energy to the main traction motor 17, and the hybrid driving system outputs the power output by the main traction motor 17 to the wheel 20.

5) When a vehicle applied with the hybrid driving system for vehicle is in the hybrid parallel driving mode, the hybrid driving system drives the vehicle in running by using power output by the engine 1 and the main traction motor 17 or the integrated starter-generator 4. In this mode, the engine 1 and one of the main traction motor 17 and the integrated starter-generator 4 (which is judged by the whole vehicle controller according to total efficiency) are controlled to perform power output, and the primary clutch 16 and the first clutch 15 are controlled to be engaged. Those skilled in the art will understand that when the vehicle is normally running for a long distance, the engine 1 and one of the main traction motor 17 and the integrated starter-generator 4 collectively drive the vehicle, and the hybrid driving system outputs power from the engine 1 and one of the main traction motor 17 and the integrated starter-generator 4 to the wheel 20.

6) When a vehicle applied with the hybrid driving system for vehicle is in the charge-in-travelling series mode, the hybrid driving system charges a battery pack of the hybrid vehicle by using power output by the engine 1, and drives the vehicle by using power output by the main traction motor 17. In this mode, the engine 1 is controlled to drive the integrated starter-generator 4 to perform electricity generating operation, the main traction motor 17 is controlled to perform power output operation, the first clutch 15 is controlled to be engaged, and the primary clutch 16 is controlled to be disengaged. Those skilled in the art will understand that when the vehicle is running at a low speed for a long time period (e.g., in a crowed road condition), the primary clutch 16 cannot be engaged due to limitations of mechanical speed ratio and the lowest operation speed of the engine 1, the main traction motor 17 drives the vehicle, the integrated starter-generator 4 enters an electricity generating mode, the electric energy required for the main traction motor 17 is provided by the integrated starter-generator 4, the insufficient part is provided by the battery pack or the residual part is absorbed by the battery pack, and the hybrid driving system outputs power from the main traction motor 17 to the wheel 20 via a main decelerator.

7) When a vehicle applied with the hybrid driving system for vehicle is in the charge-in-travelling parallel mode, the hybrid driving system drives the vehicle in running by using power output by the engine 1 and the main traction motor 17, and simultaneously charges the battery pack of the hybrid vehicle by using the integrated starter-generator 4 to generate electricity. In this mode, the engine 1 and the main traction motor 17 are controlled to output power, the integrated starter-generator 4 is controlled to perform electricity generating operation, and the primary clutch 16 and the first clutch 15 are controlled to be engaged. Under this operation condition, the power portion of the engine 1 and the main traction motor 17 directly take part in driving together, and the other portions are used by the integrated starter-generator 4 to generate electricity so as to charge battery. Those skilled in the art will understand that only under certain operation conditions such as climbing for a long distance and when the battery is insufficient to provide power required by the main traction motor 17 due to limitations on power or energy or when the torque provided by the main traction motor 17 is insufficient to drive the vehicle alone to overcome resistance, it will be required for the whole vehicle controller to control the hybrid driving system into this operation mode.

8) When a vehicle applied with the hybrid driving system for vehicle is in the braking deceleration energy recycling mode, it is determined by the vehicle controller (system) that the integrated starter-generator 4 and/or the main traction motor 17 performs energy recycling via the first stage decelerating device 9 when the vehicle is braking, based on the disengagement/engagement state of the primary clutch 16, requirement of braking power, electricity generating efficiency and allowable charging power of battery. In this mode, the main traction motor 17 and/or the integrated starter-generator 4 are controlled to generate electricity. Those skilled in the art will understand that when the vehicle applied with the hybrid driving system for vehicle is in the braking deceleration mode, a motor controller of the hybrid driving system controls the main traction motor 17 and/or the integrated starter-generator 4 to recycle energy via the first stage decelerating device 9 when the vehicle is braking and charge the battery pack.

Figure 4:
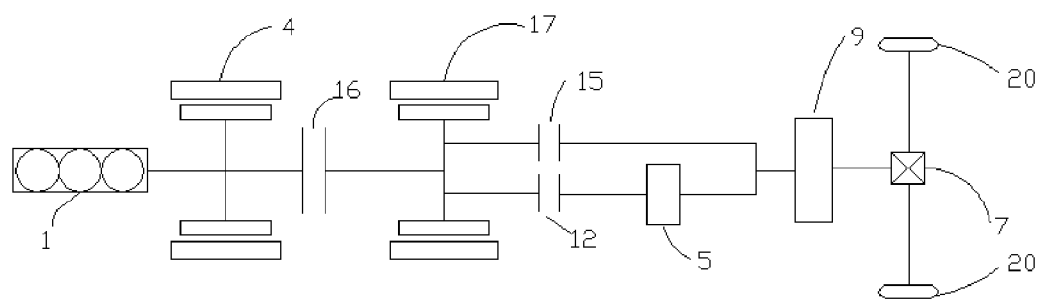
FIG. 4 illustrates a schematic structure view of a triple clutch hybrid driving system for vehicle provided by the invention and in accordance with a second embodiment of the invention.
Figure 5:
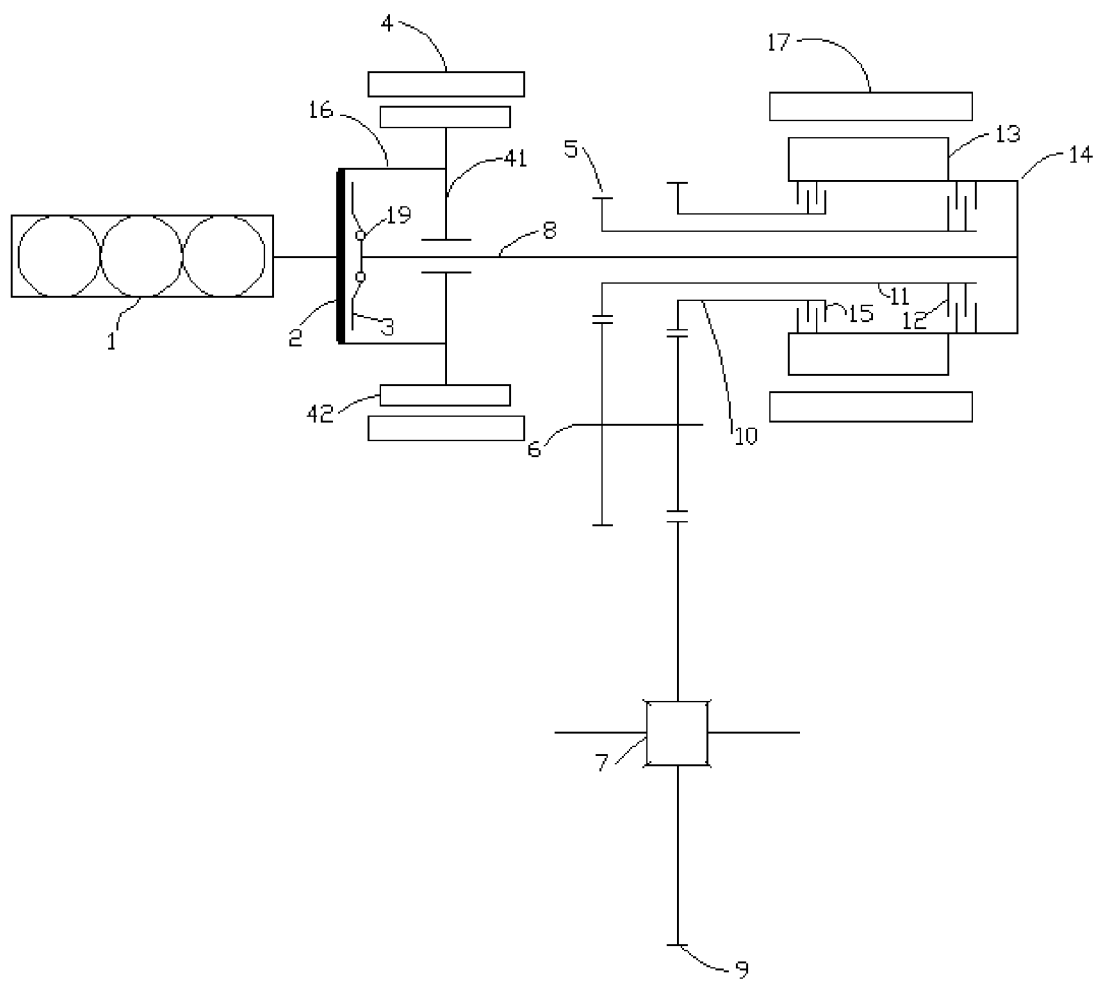
FIG. 5 illustrates a mechanical structure view of the triple clutch hybrid driving system for vehicle provided by the invention and in accordance with the second embodiment of the invention.

FIGS. 4 and 5 respectively illustrate a schematic structure view and a mechanical structure view of a triple clutch hybrid driving system for vehicle provided by the invention and in accordance with a second embodiment of the invention wherein FIG. 4 only illustrates a brief connection relationship between various components of the driving system, and FIG. 5 illustrates a detailed mechanical connection manner of various components of the driving system. The embodiment will be described hereinafter by taking FIG. 5 as an example, wherein the hybrid driving system comprises a main shaft 8, a primary clutch 16, a first stage decelerating device 9, a main traction motor 17, an integrated starter-generator 4 and an engine 1, and the hybrid driving system further comprises a first clutch 15, a first gear shaft 10, a second clutch 12, a second gear shaft 11, a third gear shaft 6 and a second stage decelerating device 5. A driving disc 2 of the primary clutch 16 is connected to the engine 1 and a rotor support 41 of the integrated starter-generator; specifically, in this embodiment, a portion of the driving disc 2 that is near the center is directly connected to the engine 1, and accordingly, the driving disc 2 of the primary clutch 16 is connected to the rotor support 41 of the integrated starter-generator at its edge away from the center. A driven disc 3 of the primary clutch 16 is connected to one end of the main shaft 8; specifically, in this embodiment, a center portion of the driven disc 3 is connected to the main shaft 8. An end of the main shaft 8 away from the primary clutch 16 is connected to a rotor support 14 of the main traction motor. The rotor support 14 of the main traction motor is connected to one end of the first gear shaft 10 via the first clutch 15, and the other end of the first gear shaft 10 is connected to a first stage driving gear of the first stage decelerating device 9. The rotor support 14 of the main traction motor is connected to one end of the second gear shaft 11 via the second clutch 12, the other end of the second gear shaft 11 is connected to a second stage driving gear of the second stage decelerating device 5, and a second stage driven gear of the second stage decelerating device 5 is connected to a bridge gear of the first stage decelerating device 9 via the third gear shaft 6. The first stage driven gear is connected to a differential 7.

With reference to FIG. 5, in this embodiment, the engine 1 and the integrated starter-generator 4 are connected to the driving disc 2 of the primary clutch 16 simultaneously. Those skilled in the art will understand that such a design enables a power connection between the engine 1 and the integrated starter-generator 4 to be maintained, i.e., the engine 1 can output power to the integrated starter-generator 4, and the integrated starter-generator 4 can either generate electricity by using power output by the engine 1, or can output power together with the engine 1. The main shaft 8 is used to transmit power of each power source of the hybrid driving system. The hybrid driving system achieves power connection and disconnection between the engine 1 and the integrated starter-generator 4 and the main shaft 8 by controlling disengagement and engagement of the primary clutch 16. Specifically, the driven disc 3 of the primary clutch 16 is connected to the main shaft 8 so that the hybrid driving system can control the engine 1 and the integrated starter-generator 4 to output mechanical power directly to the wheel 20 or not, by controlling disengagement and engagement of the primary clutch 16. The main shaft 8 is directly connected to the rotor support 14 of the main traction motor so that the power output by the engine 1 and the integrated starter-generator 4 can be transmitted to the rotor support 14 of the main traction motor so as to realize power coupling of three power sources of the hybrid driving system. The hybrid driving system realizes controls of stop, activation and gear position switch of power output of the hybrid driving system by controlling the first clutch 15 and the second clutch 12. Specifically, a driving disc of the second clutch 12 is provided on the rotor support 14 of the main traction motor so that the hybrid driving system can be connected to the second gear shaft 11 via a driven disc of the second clutch 12 and power is output outwardly through the second clutch 12, the second gear shaft 11, the second stage decelerating device 5, the third gear shaft 6, the first stage decelerating device 9 and the differential 7 in order to obtain a power transmission path for a first gear (low speed gear) of the hybrid driving system; a driving disc of the first clutch 15 is provided on the rotor support 14 of the main traction motor so that the hybrid driving system is connected to the first gear shaft 10 via a driven disc of the first clutch 15 and power is output outwardly through the first clutch 15, the first gear shaft 10, the first stage decelerating device 9 and the differential 7 in order to obtain a power transmission path for a second gear (high speed gear) of the hybrid driving system.

Further, in this embodiment, other components of the hybrid driving system except for the vehicle engine 1 and their connection manner constitute a hybrid electrical driving unit corresponding to this embodiment. With reference to FIGS. 4 and 5, the hybrid electrical driving unit comprises the main traction motor 17, the integrated starter-generator 4, the differential 7, the main shaft 8, the first stage decelerating device 9, the primary clutch 16, the first clutch 15, the second clutch 12 and the second stage decelerating device 5, wherein the main shaft 8 is connected to the main traction motor 17, the driving disc 2 of the primary clutch 16 is connected to the integrated starter-generator 4 and the vehicle engine 1, the driven disc 3 of the primary clutch 16 is connected to the main shaft 8, the hybrid electrical driving unit outputs power via the first stage decelerating device 9, the main traction motor 17 is connected to the first stage decelerating device 9 via the first clutch 15, the main traction motor 17 is connected to the second stage decelerating device 5 via the second clutch 12 and is then connected to the first stage decelerating device 9 via the second stage decelerating device 5. Specifically, connection manner of the electrical driving unit can be conducted with reference to the hybrid driving system described in this embodiment and redundant description is omitted herein. Similarly, those skilled in the art will understand that the hybrid driving unit according to this embodiment can be designed and manufactured as a separate operation component of the hybrid vehicle. For example, it can be supplied to the whole vehicle manufacturer as a separate component so as to realize a technical effect of integration.

Those skilled in the art will understand that when the hybrid driving system operates in the first gear mode, the power output will be decelerated by the second stage decelerating device 5 and the first second stage decelerating device 9 and then output; the output power has a large torque and small rotational speed, thus meeting operation requirements under such conditions as when the vehicle is starting, climbing and rapidly accelerating; whereas when the hybrid driving system operates in the second gear mode, the power output will be decelerated by the first second stage decelerating device 9 and then output; the output power has a small torque and large rotational speed, thus meeting operation requirements under such conditions as when the vehicle is running at intermediate and high speeds. The specific operation manner and control mode will be described in detail hereinafter and redundant description is omitted herein. Further, the choice between two gear positions according to the hybrid driving system for vehicle provided by the invention enables requirements on torque output and high speed running for hybrid vehicle to be met even when the requirements on the main traction motor 17 is properly lowered, and enables the range of operation conditions suitable for parallel driving operation of hybrid vehicle to be enlarged; meanwhile, the operation efficiency of the main traction motor 17 is further optimized.

Further, in this embodiment, the primary clutch 16 is provided in a space formed by the rotor support 41 of the integrated starter-generator and the main shaft 8. With reference to FIG. 5, the driving disc 2 of the primary clutch 16 is provided in the space on one side adjacent to the engine 1 and is connected to the rotor support 41 of the integrated starter-generator, and the driven disc 3 of the primary clutch 16 is provided in the space on one side adjacent to the main shaft 8. Specifically, the arrangement and technical effect of the primary clutch 16 can refer to the embodiment shown in above FIGS. 2 and 3, and redundant description is omitted herein.

Still further, in this particular embodiment, the moments of inertia of the rotor 42 and the rotor support 41 of integrated starter-generator and the driving disc 2 of the primary clutch 16 can be designed to be an equivalent to a conventional engine flywheel so that the conventional engine flywheel can be cancelled. Similarly, the arrangement thereof can refer to the embodiment shown in above FIGS. 2 and 3, and redundant description is omitted herein.

Further, in this embodiment, the first clutch 15 and the second clutch 12 are provided in a space formed by the rotor support 14 of the main traction motor and the main shaft 8. Specifically, with reference to FIG. 5, the driving disc of the first clutch 15 is connected to the rotor support 14 of the main traction motor, and the driven disc of the first clutch 15 is connected to one end of the first gear shaft 10; correspondingly, the driving disc of the second clutch 12 is connected to the rotor support 14 of the main traction motor, and the driven disc of the second clutch 12 is connected to one end of the second gear shaft 11. At this moment, the first clutch 15 and the second clutch 12 in this embodiment can be arranged without increasing volume of the hybrid driving system provided by the invention and altering the arrangement of other components of the hybrid driving system, which makes full use of space inside the hybrid driving system so that the design of hybrid driving system is made more compact.

Further, in this particular embodiment, the main shaft 8, the first gear shaft 10 and the second gear shaft 11 are arranged coaxially in the hybrid driving system. The second gear shaft 11 and the first gear shaft 10 are sequentially provided in the periphery of the main shaft 8 as hollow shafts, which does not have an influence on substantive content of the invention and redundant description is therefore omitted.

Further, in this particular embodiment, the driven disc 3 of the primary clutch 16 is preferably connected to one end of the main shaft 8 via the shock absorbing spring 19. Those skilled in the art will understand that the driven disc 3 of the primary clutch 16 can also be connected to the main shaft 8 via other elastic devices as long as the technical objective of shock absorbing can be achieved. Redundant description thereof is also omitted.

Further, those skilled in the art will understand that the hybrid driving system provided by the invention outputs power via the first stage decelerating device 9. In this embodiment, the first stage driving gear of the first stage decelerating device 9 is provided on the first gear shaft 10, and the second stage driving gear of the second stage decelerating device 5 is provided on the second gear shaft 11. Specifically, the first stage decelerating device 9 comprises a first stage driving gear, a first stage driven gear and a bridge gear, i.e., the first stage driving gear and the first stage driven gear are preferably intermeshed via a gear ring of the bridge gear as required so as to vary speed difference output and center distance of the main shaft 8, wherein the first stage driving gear of the first stage decelerating device 9 is connected to one end of the first gear shaft 10, and in a direction perpendicular to the main shaft 8, the first stage driving gear intermeshes with the bridge gear and the bridge gear intermeshes with the first stage driven gear, which is in turn connected to a housing of the differential 7. The second stage decelerating device 5 comprises a second stage driving gear and a second stage driven gear. The second stage driving gear of the second stage decelerating device 5 is connected to one end of the second gear shaft 11, and intermeshes with the second stage driven gear in a direction perpendicular to the main shaft 8, the second stage driven gear is connected to one end of the third gear shaft 6, and the other end of the third gear shaft 6 is connected to the bridge gear of the first stage decelerating device 9. Specifically, in this embodiment, the third gear shaft 6 is arranged in parallel with the main shaft 8, which facilitates the arrangement of gear shafts inside the hybrid driving system provided by the invention and corresponding hybrid two stage electrical driving unit. Those skilled in the art will understand that the above described design enables power output by the hybrid driving system to be transmitted in two paths. When the first clutch 15 is engaged, at this time the second clutch 12 is disengaged, the hybrid driving system outputs power to the first stage decelerating device 9 via the first gear shaft 10. At this moment, the speed reduction ratio of the first stage decelerating device 9 is the tooth number ratio of the first stage driven gear and the first stage driving gear, thus realizing deceleration at the second gear of the hybrid driving system and increase of output torque; when the second clutch 12 is engaged, at this time the first clutch 15 is disengaged, the hybrid driving system outputs power to the second stage decelerating device 5 and the first stage decelerating device 9 via the second gear shaft 11. At this moment, the speed reduction ratio of the second stage decelerating device 5 and the first stage decelerating device 9 is the product of the tooth number ratio of the second stage driven gear and the second stage driving gear and the tooth number ratio of the first stage driven gear and the bridge gear, thus realizing deceleration at the first gear of the hybrid driving system and increase of output torque.

Even further, when the hybrid vehicle provided by the invention switches from the first gear to the second gear (upshift) or switches from the second gear to the first gear (downshift), the whole vehicle controller of the hybrid vehicle can also realize the application of a continuous power shift function in a hybrid vehicle by controlling a synchronous disengagement/engagement of the first and second clutch 12 control mechanism, thereby ensuring a synchronous disengagement/engagement control of the first clutch 15 and the second clutch 12 during gear shift. Those skilled in the art will understand that both the powers from two output shafts (i.e., the first gear shaft 10 and the second gear shaft 11) of the invention will be linked together with the final output shaft of the electrical driving unit so as to transmit power to the wheel 20. Specifically, when the hybrid vehicle is shifting gears, the whole vehicle controller controls the first clutch 15 and the second clutch 12 simultaneously so that when one of the first clutch 15 and the second clutch 12 performs disengagement, the other one performs engagement simultaneously, thus ensuring the power output from the hybrid driving system can always be output to the wheel 20 via the first clutch 15 or the second clutch 12 so as to realize a continuous power shift function. The specific implementations thereof can be conducted with reference to other patent documents or current existing technology and are not described in detail herein.

Further, the first clutch 15 and the second clutch 12 provided by this embodiment are used in the form of a collocation of dry clutch or wet clutch, i.e., the first clutch 15 can be a dry clutch or a wet clutch, and the second clutch 12 can also be a dry clutch or a wet clutch. In this embodiment, preferably, especially in case where the inner space is sufficient to place two dry clutches, both the first clutch 15 and the second clutch 12 are dry clutches. Less preferably, in case where the inner space is only sufficient to place one dry clutch and one wet clutch, one of the first clutch 15 and the second clutch 12 is a dry clutch and the other is a wet clutch; more specifically, when the vehicle is designed to mainly run at intermediate and high speeds, the first clutch 15 is a dry clutch, and when the vehicle is designed to mainly run at intermediate and low speeds, the second clutch 12 is a dry clutch. Even less preferably, in particular in case where the inner space is not sufficient to place one dry clutch and one wet clutch, both the first clutch 15 and the second clutch 12 are wet clutches. Similarly, those skilled in the art will understand that the first clutch shown in FIG. 2 or 3 can also be a dry clutch or a wet clutch, for example preferably a dry clutch. Redundant description thereof is omitted herein.

FIG. 7 illustrates an operation mode table of the triple clutch hybrid driving system for vehicle provided by the invention and in accordance with the second embodiment of the invention. With reference to FIGS. 4, 5 and 7, those skilled in the art will understand that when the hybrid driving system for vehicle is applied with the hybrid driving system provided by this embodiment, the clutch control system can realize a switch among different operation states of the hybrid driving system by controlling disengagement/engagement of the first clutch 15 and the second clutch 12, and the hybrid driving system for vehicle realizes power disconnection and connection between the hybrid driving system and the wheel 20 as well as gear position switch by disengagement/engagement of the first clutch 15 and the second clutch 12. That is, when the first clutch 15 is engaged and the second clutch 12 is disengaged or when the first clutch 15 is disengaged and the second clutch 12 is engaged, the hybrid driving system can output power to the wheel 20; when the first clutch 15 and the second clutch 12 are disengaged, the hybrid driving system can not output power to the wheel 20; and when the hybrid driving system is shifting gears, the hybrid driving system can vary power-output torque. Correspondingly, the hybrid whole vehicle control system for vehicle performs controls to the engine 1, the integrated starter-generator 4 and the main traction motor 17 on basis of requirements on driver's accelerator/brake pedal input and can optimally select high efficient power source on basis of requirement on driver's power so as to realize various operation modes for the hybrid vehicle. Specifically, in this embodiment, at least on basis of the architecture of the hybrid driving system for vehicle shown in FIG. 4, the main traction motor 17 can be at least provided with a neutral gear parking mode, a stop-to-charge mode, a rapid acceleration and gear shift mode, a pure electric driving and gear shift mode, a hybrid parallel driving and gear shift mode, a charge-in-travelling series operation and gear shift mode, a charge-in-travelling parallel operation and gear shift mode, and a braking deceleration energy recycling mode, etc.

Those skilled in the art will understand that preferably, the hybrid driving system for realizing the afore-mentioned control modes provided by embodiment comprises the main shaft 8, the primary clutch 16, the first stage decelerating device 9, the main traction motor 17, the integrated starter-generator 4 and the engine 1, and further comprises the first clutch 15, the first gear shaft 10, the second clutch 12, the second gear shaft 11, the third gear shaft 6 and the second decelerating device 5 for realizing cease and activation of hybrid power output as well as gear position switch according to the invention. Specifically, in this embodiment, the driving disc 2 of the primary clutch 16 is connected to the engine 1 and the rotor support 41 of the integrated starter-generator, and the driven disc 3 of the primary clutch 16 is connected to one end of the main shaft 8 via the shock absorbing spring 19; one end of the main shaft 8 which is away from the primary clutch 16 is connected to the rotor support 14 of the main traction motor, the rotor support 14 of the main traction motor is sequentially connected to the first gear shaft 10 and the first stage driving gear of the first stage decelerating device 9 via the first clutch 15, the rotor support 14 of the main traction motor is sequentially connected to the second gear shaft 11 and the second stage driving gear of the second stage decelerating device 5 via the second clutch 12, the second stage driven gear is connected to the bridge gear of the first stage decelerating device 9 via the third gear shaft 6, and the first stage driven gear is connected to the differential 7.

Further, those skilled in the art will understand that the triple clutch hybrid driving system for vehicle provided by this embodiment can realize a continuous power shift function when switching gear positions in each mode, thus ensuring a synchronous disengagement/engagement control of the first clutch 15 and the second clutch 12 during gear shift. The specific control manner thereof can be conducted with reference to the second particular embodiment described above, and redundant description thereof is thus omitted.

Specifically, the operation modes based on the second embodiment will be described respectively hereinafter.

1) When a vehicle applied with the hybrid driving system for vehicle is in the neutral gear parking mode, the three power sources of the hybrid driving system for vehicle, i.e., the engine 1, the main traction motor 17 and the integrated starter-generator 4 are disconnected from the wheel 20 in power transmission. In this mode, the primary clutch 16, the first clutch 15 and the second clutch 12 are controlled to be disengaged, and the engine 1, the main traction motor 17 and the integrated starter-generator 4 are controlled to stop operating. Those skilled in the art will understand that when the vehicle applied with the hybrid driving system for vehicle is in the neutral gear parking mode and the power sources of the hybrid driving system are therefore disconnected from the wheel 20 in power transmission, a neutral gear parking function is realized and the motor and inverter are prevented from being damaged due to an overly high potential when it is required to tow the vehicle because of vehicle failure.

2) When a vehicle applied with the hybrid driving system for vehicle is in the stop-to-charge mode, the integrated starter-generator 4 charges the battery pack of the hybrid vehicle by making use of power output by the engine 1 when the vehicle is stopped. In this mode, the primary clutch 16, the first clutch 15 and the second clutch 12 are controlled to be disengaged, the whole vehicle controller of the vehicle controls the integrated starter-generator 4 to firstly enter an activation mode so as to perform ignition operation on the engine 1; then the integrated starter-generator 4 enters an electricity generating operation mode so as to charge the battery pack, and the main traction motor 17 does not operate. Those skilled in the art will understand that only when the whole vehicle controller detects that the battery volume is overly low, e.g. when the vehicle is stopped for a long time period and the air conditioner is in the operation state, will it be necessary to enter the stop-to-charge mode.

3) When a vehicle applied with the hybrid driving system for vehicle is in the rapid acceleration and gear shift mode, the hybrid driving system uses power output by the engine 1, the integrated starter-generator 4 and the main traction motor 17 to collectively drive the vehicle in running and perform gear shift function. In this mode, the engine 1, the main traction motor 17 and the integrated starter-generator 4 are controlled to output power, the primary clutch 16 and the second clutch 12 are controlled to be engaged and the first clutch 15 is controlled to be disengaged so as to achieve the first gear function in this mode, and the primary clutch 16 and the first clutch 15 are controlled to be engaged and the second clutch 12 is controlled to be disengaged so as to achieve the second gear function in this mode. Those skilled in the art will understand that in case where the vehicle applied with the hybrid driving system for vehicle requires the rapid acceleration mode, when the power required for vehicle is larger than efficiency optimized power for the engine 1, the engine 1, the main traction motor 17 and the integrated starter-generator 4 collectively output power to drive the vehicle so as to maximized output power of the hybrid driving system.

4) When a vehicle applied with the hybrid driving system for vehicle is in the pure electric driving and gear shift mode, the hybrid driving system drives the vehicle in running by using power output by the main traction motor 17 and performs gear shift. In this mode, the main traction motor 17 is controlled to output power, the engine 1 and the integrated starter-generator 4 are controlled to stop operating, the primary clutch 16 and the first clutch 15 are controlled to be disengaged and the second clutch 12 is controlled to be engaged so as to achieve the first gear function in this mode, and the primary clutch 16 and the second clutch 12 are controlled to be disengaged and the first clutch 15 is controlled to be engaged so as to achieve the second gear function in this mode. Those skilled in the art will understand that when the power required by vehicle is lower than a driving power that can be provide by the main traction motor 17 and the volume of battery pack is enough, the main traction motor 17 will drive the vehicle alone, the battery pack provides electricity energy to the main traction motor 17, and the hybrid driving system outputs the power output by the main traction motor 17 to the wheel 20.

5) When a vehicle applied with the hybrid driving system for vehicle is in the hybrid parallel driving and gear shift mode, the hybrid driving system drives the vehicle in running by using power output by the engine 1 and the main traction motor 17 or the integrated starter-generator 4 and performs gear shift. In this mode, the engine 1 and one of the main traction motor 17 and the integrated starter-generator 4 (which is judged by the whole vehicle controller according to total efficiency) are controlled to perform power output operation, the primary clutch 16 and the second clutch 12 are controlled to be engaged and the first clutch 15 is controlled to be disengaged so as to achieve the first gear function in this mode, and the primary clutch 16 and the first clutch 15 are controlled to be engaged and the second clutch 12 is controlled to be disengaged so as to achieve the second gear function in this mode. Those skilled in the art will understand that when the vehicle is normally running for a long distance, the engine 1 and one of the main traction motor 17 and the integrated starter-generator 4 collectively drive the vehicle, and the hybrid driving system outputs power from the engine 1 and one of the main traction motor 17 and the integrated starter-generator 4 to the wheel 20.

6) When a vehicle applied with the hybrid driving system for vehicle is in the charge-in-travelling and gear shift series mode, the hybrid driving system charges the battery pack of the hybrid vehicle by using power output by the engine 1, and drives the vehicle in running by using power output by the main traction motor 17 and performs gear shift. In this mode, the engine 1 is controlled to drive the integrated starter-generator 4 to perform electricity generating operation, the main traction motor 17 is controlled to perform power output operation, the second clutch 12 is controlled to be engaged and the primary clutch 16 and the first clutch 15 are controlled to be disengaged so as to achieve the first gear function in this mode, the first clutch 15 is controlled to be engaged and the primary clutch 16 and the second clutch 12 are controlled to be disengaged so as to achieve the second gear function in this mode. Those skilled in the art will understand that when the vehicle is running at a low speed for a long time period (e.g., in a crowed road condition), the primary clutch 16 cannot be engaged due to limitations of mechanical speed ratio and the lowest operation speed of the engine 1, the main traction motor 17 drives the vehicle, the integrated starter-generator 4 enters an electricity generating mode, the electric energy required for the main traction motor 17 is provided by the integrated starter-generator 4, the insufficient part is provided by the battery pack or the residual part is absorbed by the battery pack, and the hybrid driving system outputs power from the main traction motor 17 to the wheel 20.

When a vehicle applied with the hybrid driving system for vehicle is in the charge-in-travelling and gear shift parallel mode, the hybrid driving system drives the vehicle in running by using power output by the engine 1 and the main traction motor 17, and simultaneously charges the battery pack of the hybrid vehicle by using the integrated starter-generator 4 to generate electricity, and performs gear shift. In this mode, the engine 1 and the main traction motor 17 are controlled to output power, the integrated starter-generator 4 is controlled to perform electricity generating operation, the primary clutch 16 and the second clutch 12 are controlled to be engaged and the first clutch 15 is controlled to be disengaged so as to achieve the first gear function in this mode, and the primary clutch 16 and the first clutch 15 are controlled to be engaged and the second clutch 12 is controlled to be disengaged so as to achieve the second gear function in this mode. Under this operation condition, the power portion of the engine 1 and the main traction motor 17 directly take part in driving together, and the other portions are used by the integrated starter-generator 4 to generate electricity so as to charge the battery. Those skilled in the art will understand that only under certain operation conditions such as climbing for a long distance and when the battery is insufficient to provide power required by the main traction motor 17 due to limitations on power or energy or when the torque provided by the main traction motor 17 is insufficient to drive the vehicle alone to overcome resistance will it be required for the whole vehicle controller to control the hybrid driving system into this operation mode.

8) When a vehicle applied with the hybrid driving system for vehicle is in the braking deceleration energy recycling mode, it is determined by the whole vehicle controller that the integrated starter-generator 4 and/or the main traction motor 17 performs energy recycling via the first stage decelerating device 9 when the vehicle is braking, based on the disengagement/engagement state of the primary clutch 16, requirement of braking power, electricity generating efficiency and allowable charging power of battery. In this mode, the main traction motor 17 and/or the integrated starter-generator 4 are controlled to generate electricity. Those skilled in the art will understand that when the vehicle applied with the hybrid driving system for vehicle is in the braking deceleration mode, a motor controller of the hybrid driving system controls the main traction motor 17 and/or the integrated starter-generator 4 to perform energy recycling when the vehicle is braking and charge the battery pack.

Specific embodiments of the invention have been described above. It is understood that the invention is not limited to the above particular embodiments. Various variations or modifications can be made within the scope of appended claims by those skilled in the art without having an influence on the substantive content of the invention.

What is claimed is:

1. A hybrid driving system for a vehicle, comprising:
a main fraction motor;
an integrated starter-generator;
an engine;
a main shaft connected to the main traction motor;
a first gear shaft;
a first stage decelerating device;
a primary clutch including (i) a driving disc that is connected to the integrated starter-generator and to the engine, and (ii) a driven disc that is connected to the main shaft;
a first clutch;
a second clutch; and
a second stage decelerating device;
wherein the main traction motor connects to the first stage decelerating device via the first clutch when the first clutch is engaged,
wherein the main traction motor connects to the second stage decelerating device via the second clutch and to the first stage decelerating device via the second stage decelerating device when the second clutch is engaged,
wherein the first clutch connects to the first stage decelerating device via the first gear shaft,
wherein the main fraction motor, the main shaft and the first gear shaft are arranged coaxially,
wherein the hybrid driving system outputs power via the second stage decelerating device when the second clutch is engaged and the first clutch is disengaged, and
wherein the hybrid driving system does not output power via the second stage decelerating device when the first clutch is engaged and the second clutch is disengaged.

2. The hybrid driving system according to claim 1, wherein a driven disc of the first clutch is connected to a first stage driving gear of the first stage decelerating device via the first gear shaft,
wherein a driving disc of the first clutch is connected to a rotor support of the main traction motor, and
wherein the rotor support of the main traction motor is connected to the main shaft.

3. The hybrid driving system according to claim 1, wherein the first gear shaft is provided outside a periphery of the main shaft as a hollow shaft.

4. The hybrid driving system according to claim 1, further comprising:
a second gear shaft and a third gear shaft,
wherein the second clutch is connected to the second stage decelerating device via the second gear shaft, and
wherein the second stage decelerating device is connected to the first stage decelerating device via the third gear shaft.

5. The hybrid driving system according to claim 4, wherein a driven disc of the second clutch is connected to a second stage driving gear of the second stage decelerating device via the second gear shaft,
wherein a second stage driven gear is connected to a bridge gear of the first stage decelerating device via the third gear shaft, wherein a driving disc of the second clutch is connected to a rotor support of the main traction motor, and wherein the rotor support of the main traction motor is connected to the main shaft.

6. The hybrid driving system according to claim 4, wherein the main shaft, the first gear shaft and the second gear shaft are arranged coaxially.

7. The hybrid driving system according to claim 6, wherein the first gear shaft and the second gear shaft are arranged outside a periphery of the main shaft as hollow shafts.

8. The hybrid driving system according to claim 4, wherein the third gear shaft is arranged in parallel with the main shaft.

9. The hybrid driving system according to claim 1, wherein a continuous power shift is realized by controlling a synchronous disengagement/engagement of the first clutch and the second clutch.

10. The hybrid driving system according to claim 1, wherein the first clutch is provided in a space formed between a rotor support of the main traction motor and the main shaft.

11. The hybrid driving system according claim 1, wherein the second clutch is provided in a space formed between a rotor support of the main traction motor and the main shaft.

12. The hybrid driving system according to claim 1, wherein the primary clutch is provided in a space formed between a rotor support of the integrated starter-generator and the main shaft.

13. The hybrid driving system according to claim 1, wherein the driving disc of the primary clutch is directly connected to a rotor support of the integrated starter-generator.

14. The hybrid driving system according to claim 1, wherein moments of inertia of a rotor and a rotor support of the integrated starter-generator and the driving disc of the primary clutch are equivalent to that of a conventional engine flywheel.

15. The hybrid driving system according to claim 1, wherein the first stage decelerating device comprises a first stage driving gear, a first stage driven gear and a bridge gear, wherein the first stage driving gear intermeshes with the bridge gear in a direction perpendicular to the main shaft, wherein the bridge gear intermeshes with the first stage driven gear, and wherein the first stage driven gear is in turn connected to a housing of a differential.

16. The hybrid driving system according to claim 1, wherein the second stage decelerating device comprises a second stage driving gear, and a second stage driven gear, and wherein the second stage driving gear intermeshes with the second stage driven gear in a direction perpendicular to the main shaft.

17. The hybrid driving system according to claim 16, wherein the driven disc of the primary clutch is connected to one end of the main shaft via a shock absorbing spring.

18. The hybrid driving system according to claim 1, wherein the first clutch and/or second clutch is a dry clutch or wet clutch.

19. The hybrid driving system according to claim 18, wherein the first clutch is a dry clutch and the second clutch is a wet clutch.

20. A hybrid driving system for a vehicle, comprising:
a main traction motor;
an integrated starter-generator;
a main shaft connected to the main traction motor;
a first gear shaft;
a second gear shaft, wherein the main shaft, the first gear shaft, and the second gear shaft are arranged coaxially;
a third gear shaft;
a first stage decelerating device including (i) a driving gear on the first gear shaft, (ii) a driven gear, and (iii) a bridge gear on the third gear shaft, wherein the bridge gear perpendicularly intermeshes with the driving gear on the first gear shaft and the driven gear of the first stage decelerating device;
a second stage decelerating device including a driving gear on the second gear shaft, and a driven gear on the third gear shaft;
a primary clutch including (i) a driving disc that is connected to the integrated starter-generator and that is connectable to an engine of the vehicle, and (ii) a driven disc that is connected to the main shaft;
a first clutch including a driving disc on a rotor support of the main traction motor, and a driven disc on the first gear shaft; and
a second clutch including a driving disc on the rotor support of the main traction motor, and a driven disc on the second gear shaft.

21. The hybrid driving system according to claim 20, further comprising:
the engine of the vehicle, wherein the driving disc of the primary clutch is connected to the engine of the vehicle.

22. The hybrid driving system according to claim 20, wherein the second gear shaft and the first gear shaft are sequentially provided outside a periphery of the main shaft as hollow shafts.

23. The hybrid driving system according to claim 20, wherein the third gear shaft is in parallel with the main shaft.

24. The hybrid driving system according to claim 20, wherein the first clutch and the second clutch are controllable such that when one of the first clutch and the second clutch performs disengagement, the other one of the first clutch and the second clutch performs engagement simultaneously to provide a continuous power shift function.

25. The hybrid driving system according to claim 20, wherein the driving disc of the second clutch and the driven disc of the second clutch are connectable for outputting power of the hybrid driving system outwardly through the second clutch, the second gear shaft, the second stage decelerating device, the third gear shaft, the first stage decelerating device, and a differential in order to obtain a power transmission path for a low speed gear.

26. The hybrid driving system according to claim 20, wherein the driving disc of the first clutch and the first driven disc of the first clutch are connectable for outputting power of the hybrid driving system outwardly through the first clutch, the first gear shaft, the first stage decelerating device and a differential in order to obtain a power transmission path for a high speed gear.

27. The hybrid driving system according to claim 20, further comprising a differential.

* * * * *